US010262483B2

(12) United States Patent
Steinmetz

(10) Patent No.: US 10,262,483 B2
(45) Date of Patent: Apr. 16, 2019

(54) LOCK/SEAL MECHANISM CONTROLLABLE USING ENVIRONMENTAL MEASUREMENTS

(71) Applicant: Jay Steinmetz, Baltimore, MD (US)

(72) Inventor: Jay Steinmetz, Baltimore, MD (US)

(73) Assignee: Thames Technology Holdings Inc., Baltimore, MD (US)

( * ) Notice: Subject to any disclaimer, the term of this patent is extended or adjusted under 35 U.S.C. 154(b) by 0 days.

(21) Appl. No.: 15/299,663

(22) Filed: Oct. 21, 2016

(65) Prior Publication Data

US 2018/0114386 A1 Apr. 26, 2018

(51) Int. Cl.

| | |
|---|---|
| ***G05B 19/00*** | (2006.01) |
| ***G05B 23/00*** | (2006.01) |
| ***G06F 7/00*** | (2006.01) |
| ***G06F 7/04*** | (2006.01) |
| ***G06K 19/00*** | (2006.01) |
| ***G08B 29/00*** | (2006.01) |
| ***G08C 19/00*** | (2006.01) |
| ***H04B 1/00*** | (2006.01) |
| ***H04B 1/38*** | (2015.01) |
| ***H04B 3/00*** | (2006.01) |
| ***H04Q 9/00*** | (2006.01) |
| ***G07C 9/00*** | (2006.01) |
| ***E05B 39/00*** | (2006.01) |
| ***E05B 47/00*** | (2006.01) |

(52) U.S. Cl.
CPC ........ *G07C 9/00309* (2013.01); *E05B 39/005* (2013.01); *E05B 47/0001* (2013.01); *G07C 9/00571* (2013.01); *G07C 2009/0092* (2013.01); *G07C 2009/00793* (2013.01)

(58) Field of Classification Search
CPC ...... G07C 9/00309; G07C 2009/00793; E05B 47/0001; E05B 39/005
USPC ........................................................ 340/5.61
See application file for complete search history.

(56) References Cited

U.S. PATENT DOCUMENTS 9,347,746 B1 * 5/2016 Andrews ............... F41H 5/0492
2005/0232747 A1 * 10/2005 Brackmann ............... B60P 3/14 414/803
2016/0098871 A1 * 4/2016 Oz ...................... G07C 9/00111 340/5.61

* cited by examiner

*Primary Examiner* — Tanmay K Shah
(74) *Attorney, Agent, or Firm* — Occhiuti & Rohlicek LLP

(57) ABSTRACT

Disclosed are devices, systems, apparatus, methods, products, and other implementations, including a method that includes obtaining, by a lock system, environmental data representative of characteristics of an environment at which a lock device, configured to control access to a structure, is located, with the lock device including a lock controller in electrical communication with a lock mechanism. The method further includes controlling the lock mechanism of the lock device based on a comparison of at least one of the characteristics of the environment to corresponding predetermined data associated with the lock device.

21 Claims, 4 Drawing Sheets

LOCK/SEAL MECHANISM CONTROLLABLE USING ENVIRONMENTAL MEASUREMENTS

BACKGROUND

To increase security of freight and shipments, locks and seals may be used to control access to the cargo being transported. Use of locks or seals, however, may make it more challenging to manage the handling and delivery of individual shipping structures (containers) and their respective cargo to their respective destinations.

SUMMARY

The devices, methods, products, systems, apparatus, and other implementations described herein include a method comprising obtaining, by a lock system, environmental data representative of characteristics of an environment at which a lock device, configured to control access to a structure, is located, with the lock device including a lock controller in electrical communication with a lock mechanism. The method further includes controlling the lock mechanism of the lock device based on a comparison of at least one of the characteristics of the environment to corresponding pre-determined data associated with the lock device.

Embodiments of the method may include at least some of the features described in the present disclosure, including one or more of the following features.

Obtaining the environmental data may include wirelessly receiving from a remote device, at the lock device, the environmental data.

Wirelessly receiving from the remote device the environmental data may include wirelessly receiving the environmental data, via a near-field interface of the lock device, from a mobile device located within near-field communication range of the lock device.

The near-field interface may include a Bluetooth Low energy (BLE) interface.

Obtaining the environmental data may include determining, at the lock device, at least some of the environmental data based on measurements data obtained by one or more sensors of the lock device.

The method may further include storing on a memory storage device coupled to the lock device the pre-determined data associated with the lock device.

Controlling the lock mechanism of the lock device based on the comparison of the at least one of the characteristics of the environment to the corresponding pre-determined data associated with the lock device may include receiving from a remote wireless device an actuation signal to cause the lock mechanism of the lock to unlock, the actuation signal transmitted in response to a determination, at the remote wireless device, that the at least one characteristic of the environment substantially matches the corresponding pre-determined data associated with the lock device, with the corresponding pre-determined data associated with the lock device being stored at the remote wireless device.

The at least one of the characteristics of the environment may include a geographical position of a mobile device in communication with the lock device, and controlling the lock mechanism may include determining whether to unlock the lock device based on a determination of whether the geographical position of the mobile device substantially matches a pre-determined destination position.

The at least one of the characteristics of the environment may include a temperature of the environment in which the lock device is located, the pre-determined data associated with the lock device may include a pre-determined temperature value at which cargo inside the structure needs to be maintained, and controlling the lock mechanism may include determining whether to unlock the lock device based on a determination of whether the temperature of the environment in which the lock device is located substantially matches the pre-determined temperature value at which the cargo inside the structure needs to be maintained.

The at least one of the characteristics of the environment may include motion data representative of motion of the lock device, and controlling the lock mechanism may include determining whether to unlock the lock mechanism based on a determination of whether the motion data substantially matches a pre-determined motion value.

The pre-determined data associated with the lock device may include one or more of, for example, cargo placed inside the structure, destination for cargo, attributes of cargo, and/or handling requirements for the cargo.

The lock mechanism may include one or more of, for example, an electromagnetic lock operable in a fail-secure configuration, and/or an electrical strike lock operable in the fail-secure configuration.

The method may further include determining, based on current temperature data obtained for the lock system, based on pre-determined temperature data relating to temperature handling requirements for cargo inside the structure, and based on current location data, navigation data to one or more refrigeration centers to facilitate temperature handling for the cargo.

In some variations, an additional method is provided that includes obtaining, by a lock device comprising a lock controller in electrical communication with a lock mechanism, environmental data representative of characteristics of an environment at which the lock device is located, with the lock device being configured to control access to a structure. The additional method further includes controlling, by the lock device, the lock mechanism of the lock device based on a comparison of at least one of the characteristics of the environment to corresponding pre-determined data associated with the lock device.

Embodiments of the additional method may include at least some of the features described in the present disclosure, including at least some of the features described above in relation to the first method, as well as one or more of the following features.

Obtaining the environmental data may include one or more of, for example, wirelessly receiving at least some of the environmental data from a remote device that collected the at least some of the environmental data, via a near-field communication interface of the lock device, and/or measuring at least some other of the environmental data using one or more sensors of the lock device coupled to the lock controller.

Controlling the lock mechanism of the lock device may include one or more of, for example, determining whether to unlock the lock mechanism based on a determination of whether a geographical position of a mobile device in communication with the lock device substantially matches a pre-determined destination position stored at the lock device, and/or determining whether to unlock the lock mechanism based on a determination of whether a temperature of the environment in which the lock device is located substantially matches a pre-determined temperature value, stored at the lock device, at which cargo inside the structure needs to be maintained.

In some variations, a lock device is provided to inhibit physical access to a structure on which the lock device is placed. The device includes a lock mechanism, a communication module to communicate with remote devices, with the communication module configured to obtain from at least one of the remote devices environmental data representative of characteristics of an environment at which the lock device is located, and a controller coupled to the lock mechanism. The controller is configured to control the lock mechanism of the lock device based on a comparison of at least one of the characteristics of the environment to corresponding pre-determined data associated with the lock device.

Embodiments of the lock device may include at least some of the features described in the present disclosure, including at least some of the features described above in relation to the methods, as well as one or more of the following features.

The communication module may be configured to obtain a message including a geographical position of a mobile device in communication with the lock device, and the controller configured to control the lock mechanism may be configured to determine whether to unlock the lock mechanism based on a determination of whether the geographical position of the mobile device substantially matches a pre-determined destination position.

The communication module may be configured to obtain a message including a temperature of the environment in which the lock device is located, and the controller configured to control the lock mechanism may be configured to determine whether to unlock the lock mechanism based on a determination of whether the temperature of the environment in which the lock device is located substantially matches a pre-determined temperature value at which a cargo inside the structure needs to be maintained.

The lock device may include one or more of, for example, a memory storage device to store the corresponding pre-determined data associated with the lock device, and/or one or more sensors to measure data relating to one or more of the characteristics of the environment at which the lock device is located.

Details of one or more implementations are set forth in the accompanying drawings and in the description below. Further features, aspects, and advantages will become apparent from the description, the drawings, and the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
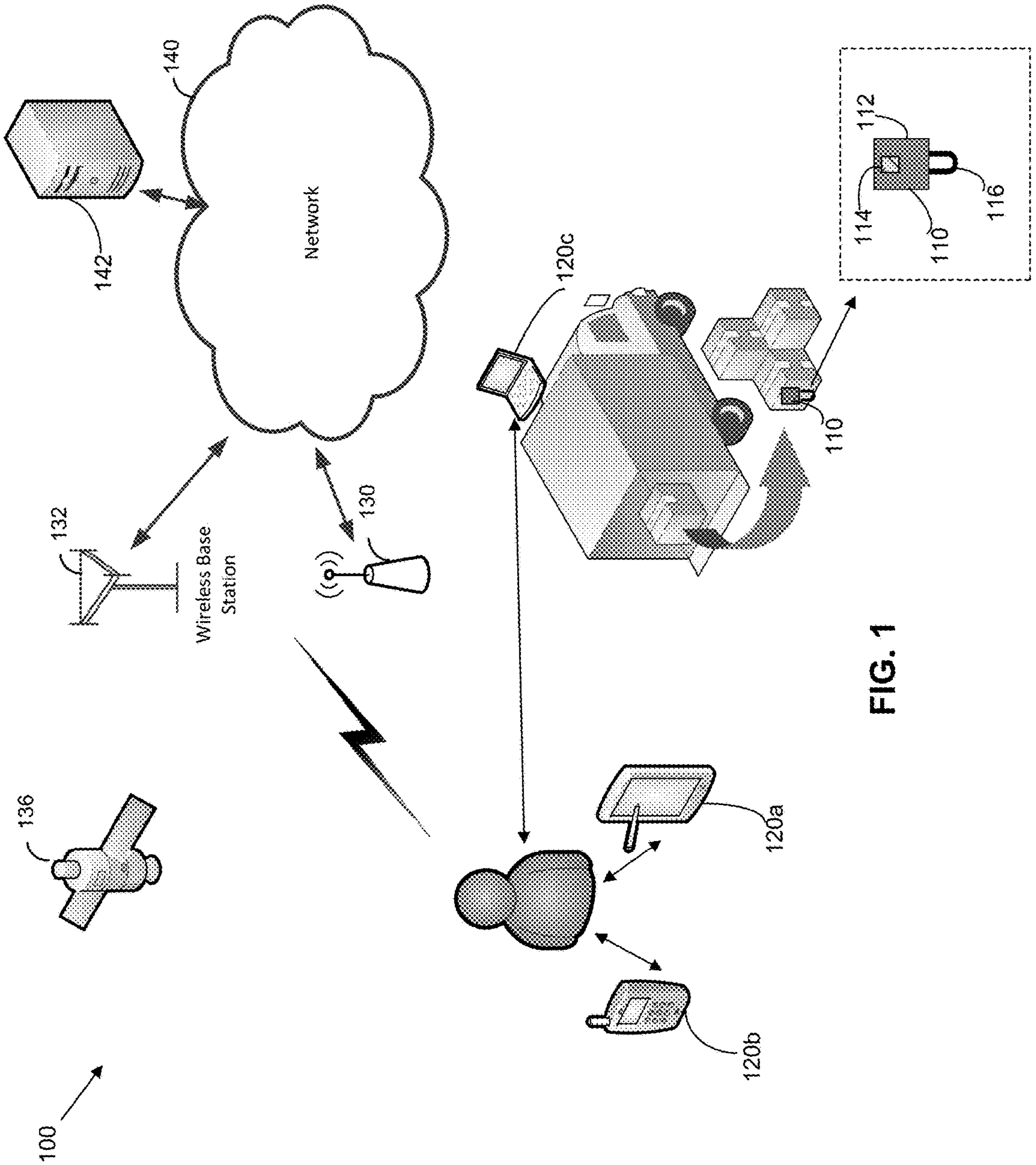
FIG. 1 is a diagram of an example system to control a lock device or seal based on environmental data.

A lock or seal device configured to be that unlocked based on environmental data, such as position, temperature, motion, etc. is disclosed. The environmental data may be received, in some embodiments, from a mobile device that is within range from the lock/seal. Thus, for example, a lock device may be configured to obtain environmental data representative of characteristics of an environment at which a lock device (used to control access to a structure, such as a freight or container) is located, and to control a lock mechanism of the lock device (e.g., unlock the lock mechanism) based on a comparison of at least one of the characteristics of the environment to a corresponding pre-determined value.

Accordingly, disclosed herein are systems, devices, methods, and various implementations, including a method to control a lock device (a processor-based device to actuate an electrically/magnetically-based or mechanically-based lock device), with such a method including obtaining, by a lock system (which may include the lock device, comprising a lock controller and a lock mechanism, and at least one remote device, such as a mobile device), environmental data representative of characteristics of an environment at which a lock device, configured to control access to a structure, is located. The method further includes controlling the lock mechanism of the lock device based on a comparison of at least one of the characteristics of the environment to corresponding pre-determined data associated with the lock device (such pre-determined data may include, for example, data about the cargo placed in the structure whose access is controlled by the lock device including cargo attributes, destination(s) data for the cargo, handling requirements for the cargo (e.g., temperature), etc.) For example, in some embodiments, the lock device may receive environmental condition or location/motion data from sensors in communication with the lock device, or via a wireless transmission from a remote device (e.g., a near-by mobile device, such as a smartphone), and compare those to pre-determined data stored in a memory module of the lock device. If, for example, a position approximation measured or wirelessly received by the lock device substantially matches (within some confidence or tolerance level) a pre-determined location (which may correspond to a destination location) thus indicating that the lock device has reached its pre-determined destination, the lock device may actuate the lock mechanism to unlock it and allow access to an inside of a structure that the lock device was inhibiting access to. Alternatively, operations to obtain and process environmental data (including to measure and derive environmental data, and compare it to pre-stored data associated with the lock device) may be performed at the at least one remote device. If, based on the comparison results, it is determined that the lock device may be unlocked, the remote device may send an RF transmission to the lock device to cause the lock device to unlock. In such embodiments, the lock device may receive the RF transmissions, optionally authenticate it (the RF transmission may include a certificate or a signature from pre-authorized users or devices from which the lock device is allowed to receive and act-upon communicated transmissions). In some embodiments, the remote device may communicate with the lock device via near-field interfaces such as a Bluetooth Low Energy interface.

Thus, with reference to FIG. 1, a diagram of an example system 100 to control a lock device or seal based on environmental data (including location and motion information, environmental conditions such as temperature, etc.) is shown. The system 100 includes at least one lock device 110, which may be a processor-based lock device or seal. Although one lock device is depicted in FIG. 1, any number of such lock devices may be used. The lock device 110 includes a controller housing 112 that generally comprises a lock controller (an example implementation of which is provided with reference to FIG. 2) in communication with a communication module 114 configured to receive and/or transmit wireless communications according to WLAN communication protocols, near-field communication protocols (Bluetooth, Bluetooth Low Energy, RFID, etc.), WWAN communication protocols, etc. An example implementation of a near-field interface that may be used, in some embodiments, is a Bluetooth Low Energy (BLE) communication interface, which is suited for implementation in which power (e.g., electrical power) may be limited or scarce. For example, the lock device 110 may be in transit for long periods of time, and thus may have limited capacity to provide power to the lock device. The BLE communication interface is configured to receive transmissions, also referred to as beacons, that may have been configured according to, for example, an iBeacon protocol. Where the communication interface 114 is realized using different communication protocols/technologies, different types of transmissions (e.g., produced according to WLAN or WWAN protocols) may be used. The communication interface 114 may further be configured to transmit messages produced by the locking device 110 (e.g., iBeacon advertisements, in embodiments in which the communication interface includes a BLE interface, notifications about the status of the lock device, etc.) In some embodiments, the controller housing 112 may also include an energy harvesting unit (shown in FIG. 2) to harvest RF energy (e.g., from transmissions carrying data and control signaling to the lock device 110, or from ambient RF transmissions not specifically directed to the lock device 110), or to harvest energy from other sources (e.g., harvesting mechanical energy, including from acoustic waves, via piezo-electric-based harvesting devices, solar energy harvesting device, and so on).

In some embodiments, the lock device 110 may also include one or more sensors, including, inertial sensors, such as an accelerometer, gyroscope, magnetometer, etc., environmental condition sensors (a barometer, which may be used to measure and/or derive altitude, thermometer), RF sensors (e.g., GNSS receiver to receiver satellite transmissions, e.g., from satellite vehicles such as the satellite vehicle 136 depicted in FIG. 1, based on which positioning operations may be performed, RF transceivers, configured to receive RF signals, such as WLAN signals, WWAN signal, near-field signals (e.g., based on BLE signals), etc.) As noted, and as will be discussed in greater detail below, in various implementations, at least some of the sensors that are used to obtain data based on which a determination is made as to whether unlock, or unseal, the lock device, may be physically coupled to one or more devices, such as a mobile device configured to communicate with the lock device and provide control information to facilitate operation of the lock device. The lock device 110 may also include a user interface to provide information about operations of the lock device (e.g., data, provided visually via a screen device included with the lock device; not shown in FIG. 1, aurally, via a speaker device included with the lock device, or via some other user-interface mechanism).

As further illustrated in FIG. 1, the lock device 110 further include a lock mechanism 116 (schematically depicted as a ‘U’-shaped member) that is electrically controlled (e.g., actuated) by the controller inside the controller housing 112. The lock mechanism is actuated to an unlocked state in response to a determination that environmental data (i.e., data representative of measurements or states in the environment of the lock device, including location/motion of the lock device, the cargo, or a remote device communicating with the lock device) is such that the lock device should be unlocked. For example, if a derived position associated with the lock device 110 substantially matches pre-determined destination data associated with the lock device, the lock device is unlocked. In some embodiments, the lock mechanism 112 may include one or more of, for example, an electromagnetic lock (implemented based on an arrangement of an electromagnetic strip and an armature), an electrical-strike lock (with a displaceable mechanical locking component, such as a bolt, that moves, e.g., using an electrical motor or some other displacement mechanism, in response to electrical actuation), etc. In some embodiments, the lock mechanism may be implemented in a fail-secure configuration, in which when electrical power is not delivered to the lock mechanism, the lock mechanism will be in a locked state lock. This configuration may be useful in situations where cargo is being shipped, and there may be limited available power to actuate the lock mechanism. Thus, for example, in response to a determination that received or measured environmental data substantially matched pre-determined data associated with the lock device 110, power may briefly be delivered to the lock mechanism 116 to actuate the lock mechanism, e.g., electro-magnetically, or electro-mechanically (for example, using an electrical motor) and cause the lock mechanism to be unlocked. In such embodiments, when no power is delivered to the lock mechanism, the lock mechanism will remain locked. Alternatively, in some embodiments, the lock mechanism 116 may be implemented in a fail-safe configuration, in which power delivery causes lock mechanism to be in a locked state, and termination of power delivery causes the lock mechanism to unlock. In some embodiments, the lock mechanism may be a seal that can be manually actuated from a closed (or locked) state, to an open (or unlocked state). While a seal provides less of an obstacle to the structure controlled by the seal than a lock mechanism, the seal can indicate whether and when the seal’s state has been changed (and thus, whether there may have been an unauthorized access to the structure controller by the lock device or seal).

As further depicted in FIG. 1, data to control access to the lock device 110, including to data comprising instructions authorizing the unlocking of the lock device, data relating to environmental data (measured and/or derived), data to request information from the lock device 110, and so on, may be communicated by a mobile device, such as, for example, a tablet-type device 120*a* (such as an iPad™), a smartphone device 120*b* (or any other type of a mobile device), a lap-top (which may portable or secured, via a docking station, to the delivery truck carrying the structure to which the lock device is affixed), or any other device equipped with wireless communication modules that can establish a communication channel with the lock device 110. The mobile devices 120*a*, 120*b*, and/or 120*c* may themselves be in communication with any type of remote network node, including WLAN nodes, such as WLAN node 130, one or more WWAN nodes, such as the WWAN node 132, and so on. Any of the depicted devices and nodes of system 100 may be elements in various types of communications networks, including a wide area wireless network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. The contents of the above-mentioned documents is hereby incorporate by reference in their entireties. A WLAN may include, for example, an IEEE 802.11x network. A WPAN may include, for example, a Bluetooth network (including one based on Bluetooth Low Energy protocol), an IEEE 802.15x, RDID-based networks, other near-field communication networks, etc. In some embodiments, 4G networks, Long Term Evolution ("LTE") networks, Advanced LTE networks, Ultra Mobile Broadband (UMB) networks, and all other types of cellular and/or wireless communications networks may also be implemented and used with the systems, methods, and other implementations described herein. While the example illustrated in FIG. 1 includes a single wireless base station and a single WLAN node, in other implementations the network environment or system illustrated in FIG. 1 may include more or fewer than the nodes 130 and/or 132 which have coverage areas that may overlap at least in part. In some embodiments, the network environment 100 may include no wireless base stations. In some variations, communication between any of the interfaces 120*a-c* and a remote system may be implemented based on any combination of the WWAN, WLAN and/or the WPAN described herein.

The example system 100 of FIG. 1 may further include a server 142 (e.g., a location server, such as an Evolved Serving Mobile Location Center (E-SMLC) server, a security administrator server to track and monitor shipped cargo, or any other type of server) configured to communicate, via a network 140 (which may be a packet-based network, such as the public Internet), or via wireless transceivers included with the server 142, with multiple network elements or nodes, and/or mobile wireless devices. For example, the server 142 may be configured to establish communication links with one or more of the nodes (e.g., the nodes 130 and 132 of FIG. 1), which may be part of the network 140, to communicate data and/or control signals to those nodes, and receive data and/or control signals from the nodes. Each of the nodes 130 and/or 132 can, in turn, establish communication links with lock system (e.g., to the mobile device 120 and/or directly to the lock device 110) within range of the respective nodes. The server 142 may also be configured to communicate directly with the lock device 110 or with any of the mobile devices 120*a-c*. In some embodiments, the server 142 may also be configured to perform some of the lock-control operations described herein, including to obtain environmental data and compare it to pre-determined data associated with the lock device.

In operation, environmental data representative of characteristics of an environment at which the lock device is located, including location and motion data representative of the location and motion of the lock device (and, by extension, of cargo inside the structure to which access is controlled by the lock device) is obtained. The lock device generally includes a controller (inside a controller housing, and comprising one or more processors, and a communication module, such as a BLE transceiver) and a lock mechanism. Optionally, the controller of the lock device may include one or more sensors that may be used to facilitate obtaining the environmental data and/or a user-interface device. In some embodiments, at least some of the environmental data may be provided by a remote device (such as the mobile device 120*a*-120*c* depicted in FIG. 1). Based on a comparison of at least one characteristics of the environment in which the lock device is located to pre-determined data associated with the lock device, the lock mechanism of the lock device is controlled (e.g., an electromagnet lock or an electro-mechanical lock is actuated to, for example, an unlocked state). For example, when the environmental data includes location data, the location data is compared to pre-determined destination data associated with the lock device. If the location data the pre-determined destination data substantially match (e.g., the difference between them is within some pre-determined tolerance of, for example, 1 m, 5 m, 10 m, or any other values representative of distance), the lock mechanism may be actuated to an unlocked state. As discussed, in some embodiments, to preserve power of the lock device, some of the operations to control the lock mechanism, including the acquisition of environmental data, storage of pre-determined data, and/or transmission of actuation signals (which themselves may be used to power the actuation of the lock mechanism via an energy harvest unit) may be performed by a remote device (such as either of the device 120*a*-120*c* of FIG. 1). Wireless signals transmitted by the remote device may need to be authenticated (e.g., signing content of transmissions from the remote device with a secret symmetric cryptographic key that is also provided to the lock device, or alternatively, signing the transmission with a private key of an asymmetric private-public key pair). As noted, the transmissions may be produced/configured according to a BLE communication protocol. If authenticated, upon verification at the lock device of the transmissions received from the remote device, the received data and/or control signals may be acted upon. In some embodiments, authentication may performed by applying a validation function (e.g., hash function such as SHA-0, SHA-256, or any other appropriate validation function) to a payload of a message to be transmitted, and encrypting the resultant validation results with a secret key available at the authenticating device (e.g., a private key of a private-public cryptographic key pair). The encrypted record is included with the message comprising the payload to be transmitted (e.g., measurement data, or actuation signal, as well as any required control signaling) and transmitted to the lock device. The lock device may then decrypt the encrypted record, and independently apply the same validation function to the payload. If the decrypted message and the independent hash result match, this may be indicative that the message was received from a legitimate source (i.e., a source using the correct secret key).

Figure 2:
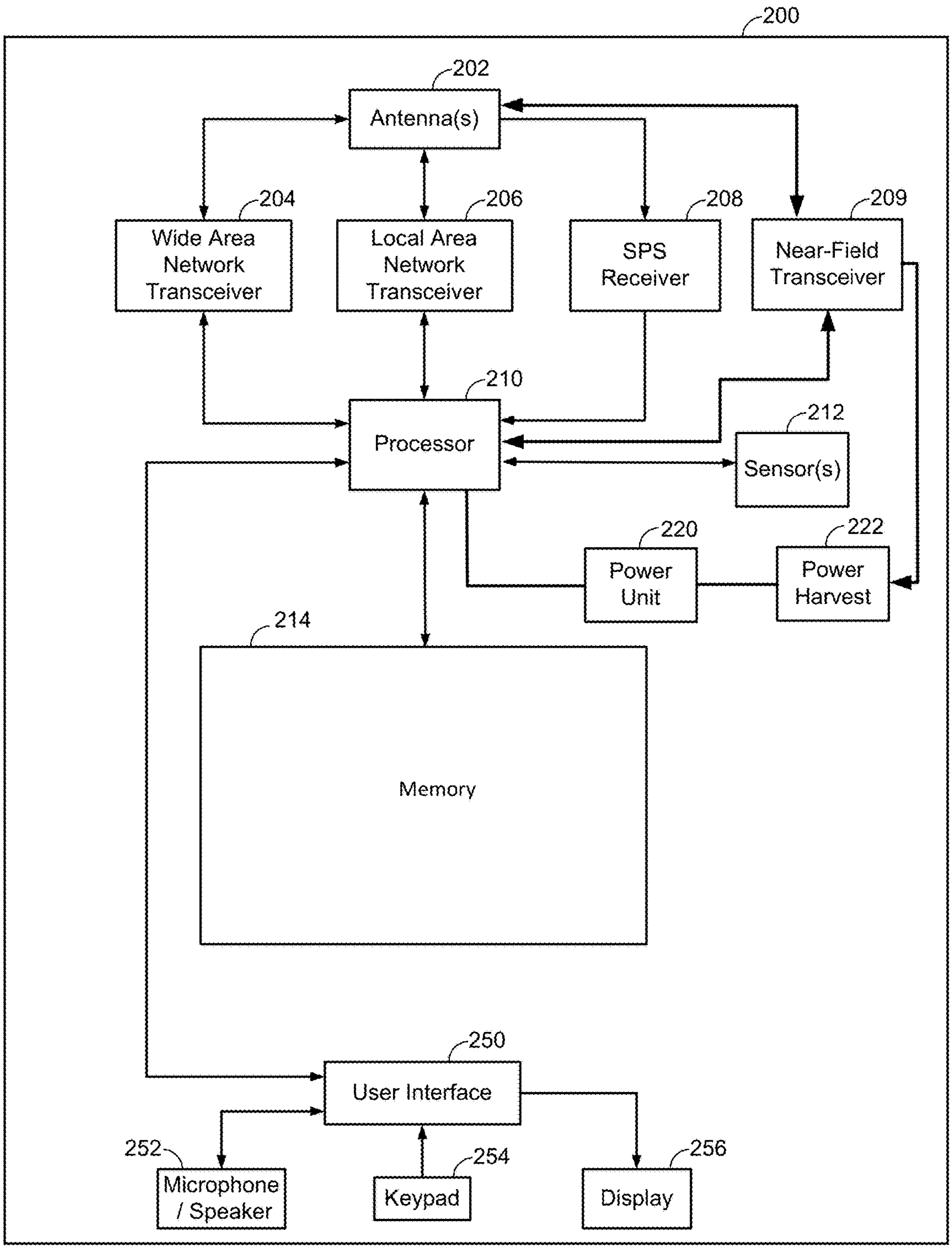
FIG. 2 is a schematic diagram of an example controller-based device that may be used to implement any one of the devices and nodes of FIG. 1.

With reference now to FIG. 2, a schematic diagram of an example device 200, which may be similar to, and be configured to have a functionality similar to that, of the controller 112 of the lock device 110, the remote devices 120*a-c*, the nodes 130 and 132, and/or the server 142 of FIG. 1, is shown. It is to be noted that one or more of the modules and/or functions illustrated in the example of FIG. 2 may be further subdivided, or two or more of the modules or functions illustrated in FIG. 2 may be combined. Additionally, one or more of the modules or functions illustrated in FIG. 2 may be excluded.

As shown, the example device 200 may include one or more transceivers (e.g., a LAN transceiver 206, a WLAN transceiver 204, a near-field transceiver 209, etc.) that may be connected to one or more antennas 202. The transceivers 204, and 206, and/or 209 may comprise suitable devices, hardware, and/or software for communicating with and/or detecting signals to/from a network or remote devices (such as devices/nodes depicted in FIG. 1) and/or directly with other wireless devices within a network. In some embodiments, by way of example only, the transceiver 206 may support wireless LAN communication (e.g., WLAN, such as WiFi-based communications) to thus cause the device 200 to be part of a WLAN implemented as an IEEE 802.11x network. In some embodiments, the transceiver 204 may support the device 200 to communicate with one or more cellular access points (also referred to as a base station) used in implementations of Wide Area Network Wireless Access Points (WAN-WAP), which may be used for wireless voice and/or data communication. A wireless wide area network (WWAN) may be part of a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. As noted, a CDMA network may implement one or more radio access technologies (RATs) such as cdma2000, Wideband-CDMA (W-CDMA), and so on. Cdma2000 includes IS-95, IS-2000, and/or IS-856 standards, and a TDMA network may implement Global System for Mobile Communications (GSM), Digital Advanced Mobile Phone System (D-AMPS), or some other RAT.

As described herein, in some variations, the device 200 may also include a near-field transceiver (interface) configured to allow the device 200 to communicate according to one or more near-field communication protocols, such as, for example, Ultra Wide Band, ZigBee, wireless USB, Bluetooth (classical Bluetooth), Bluetooth Low Energy (BLE) protocol, etc. When the device on which a near-field interface is included is configured to only receive near-field transmissions, the transceiver 209 may be a receiver and may be not capable of transmitting near-field communications. For example, a lock device, such as the lock device 110 of FIG. 1 may have a limited power supply (or may not have any type of power supply, and instead may be configured for passive operation only, as is the case with passive RFID devices), and may thus be realized so that it can only receive RF transmissions. In such embodiments, power derived from the incoming signal may be used to provide the power required to perform signal processing operations (e.g., demodulating and decoding the signal, authenticating the signal if, for example, the signal includes a cryptographic signature, etc.).

As further illustrated in FIG. 2, in some embodiments, an SPS receiver 208 may also be included in the device 200. The SPS receiver 208 may be connected to the one or more antennas 202 for receiving satellite signals. The SPS receiver 208 may comprise any suitable hardware and/or software for receiving and processing SPS signals. The SPS receiver 208 may request information as appropriate from the other systems, and may perform the computations necessary to determine the device's 200 position using, in part, measurements obtained by any suitable SPS procedure. Such positioning information may be used, for example, to determine the location and motion of the lock device, and to control actuation of the lock device. Additionally and/or alternatively, the device 200 may derive positioning information based on signals communicated to and from access points (and/or base stations), e.g., by performing multilateration position determination procedures based on metrics derived from the communicated signals. Such metrics from which the device 200's position may be determined include, for example, timing measurements (using techniques based on round trip time, or RTT, measurements, observed-time-difference-of-arrival, or OTDOA, in which a mobile device measures time differences in received signals from a plurality of network nodes, and so on), signal-strength measurements (e.g., received signal strength indication, or RSSI, measurements, which provide a representation of signal power level of a signal received by an antenna of the mobile device), etc.

In some embodiments, one or more sensors 212 may be coupled to a processor 210 to provide data that includes relative movement and/or orientation information which is independent of motion data derived from signals received by, for example, the transceivers 204, 206, and/or 209, and the SPS receiver 208. By way of example but not limitation, sensors 212 may utilize an accelerometer (e.g., a MEMS device), a gyroscope, a geomagnetic sensor (e.g., a compass), and/or any other type of sensor. Moreover, sensor 212 may include a plurality of different types of devices and combine their outputs in order to provide motion information. The one or more sensors 212 may further include an altimeter (e.g., a barometric pressure altimeter), a thermometer (e.g., a thermistor), an audio sensor (e.g., a microphone), a camera or some other type of optical sensors (e.g., a charge-couple device (CCD)-type camera, a CMOS-based image sensor, etc., which may produce still or moving images that may be displayed on a user interface device, and that may be further used to determine an ambient level of illumination and/or information related to colors and existence and levels of UV and/or infra-red illumination), and/or other types of sensors.

The output of the one or more sensors 212 may provide additional data about the environment in which any of the devices/nodes of FIG. 1 are located, and such data may be used to perform control operations in relation to the lock device. For example, temperature information may be compared to a pre-determined (and pre-stored) temperature data associated with the cargo. In such embodiments, a decision as to whether or not to unlock or unseal the lock device may be based on a discrepancy between the ambient temperature and the temperature required for safe storage of the cargo. For example, if the cargo requires refrigeration and must be kept at a temperature below some pre-determined maximum temperature, a measurement of the ambient temperature which exceeds that pre-determined maximum may be used to prevent/inhibit generation of an actuation signal to unlock the lock device (to actuate the lock mechanism to an unlocked state), and cause a notification or alert to be sent to an authorized party (e.g., the party using the mobile device, such as the mobile devices 120*a-c* of FIG. 1) in communication with the lock device, advising of the discrepancy in temperature (and/or providing any other type of notification regarding the lock device, environmental conditions, and/or other alerts and notices).

In some embodiments, data collected by the various one or more sensors 212 (be it motion data, location data derived based on RF measurements by any of the communication modules of the device 200, and/or other environmental data collected by any of the sensors) may also be used to perform other operations related to the management of the cargo and/or the lock device. For example, if the cargo requires to be provided to a refrigeration center within a certain time period that depends on ambient temperature and the elapsed in-transit time for the cargo, temperature data obtained for the environment in which the cargo is stored (such data may be obtained from the lock device's temperature sensor and/or a temperature sensor of a nearby mobile or stationary device) may be used to determine if the cargo should be delivered to a refrigeration center (or to otherwise determine if temperature management operations, such as placing the structure holding the cargo in ice, need to be performed). If it is determined that the cargo needs to be delivered to some intermediate refrigeration center or that some other temperature management/remediation operation needs to be performed, location data, derived from RF and or motion data may be used to determine a location approximation for the structure holding the cargo, and navigation data may be derived to provide directions to a location in which the temperature management/remediation operation may be performed.

In some embodiments, sensor measurements may also be used to perform cargo security functionality. For example, various sensor measurements may be monitored to identify attempts to gain unauthorized access to the cargo. For example, unexpected relative motion of the structure holding the cargo (as may be determined from measurements by motion/inertial sensors housed within the controller housing of the lock device) may indicate that someone is trying to move the cargo. In another example, a change in the ambient light level (e.g., resulting from a rogue party directing a flash light at the lock device during an attempt to breach the lock) may also be indicative of an unauthorized access attempt. In either of these situations (as well as in numerous other example situations, not specifically discussed herein, that may indicate an unauthorized access to cargo), an alert may be sent to one or more remote devices (e.g., the nearby device used to communicate with the lock device, another remote smartphone of, for example, the owner of the lock device or the cargo, and/or a remote server, such as the server 142, which may be a central security administration server to monitor the status of in-transit cargo).

With continued reference to FIG. 2, the device 200 may include a power unit 220 such as a battery and/or a power conversion module that receives and regulates power from an outside source (e.g., AC power, in situations where the device 200 is used to implement a mobile or stationary device to control a lock device). In some embodiments, e.g., when the device 200 is used to implement a lock device which may not have readily available access to replacement power (e.g., replacement batteries) or AC power, the power source 220 may be connected to a power harvest unit 222. The power harvest unit 222 may be configured to receive RF communications, and harvest the energy of the received electromagnetic transmissions (although FIG. 2 illustrates the unit 222 receiving RF communication via the near-field interface 209, the power harvest unit 222 may be connected to, and receive RF energy from, any of the other communication interfaces depicted in FIG. 2). An RF harvest unit generally includes an RF transducer circuit to receive RF transmissions, coupled to an RF-to-DC conversion circuit (e.g., an RF-to-DC rectifier). Resultant DC current may be further conditioned (e.g., through further filtering and/or down-conversion operation to a lower voltage level), and provided to a storage device realized, for example, on the power unit 220 (e.g., capacitor(s), a battery, etc.)

The processor (also referred to as a controller) 210 may be connected to the transceivers 204 and/or 206, the SPS receiver 208 and the motion sensor 212. The processor may include one or more microprocessors, microcontrollers, and/or digital signal processors that provide processing functions, as well as other calculation and control functionality. The processor 210 may also include memory 214 for storing data and software instructions for executing programmed functionality within the device.

Figure 4:
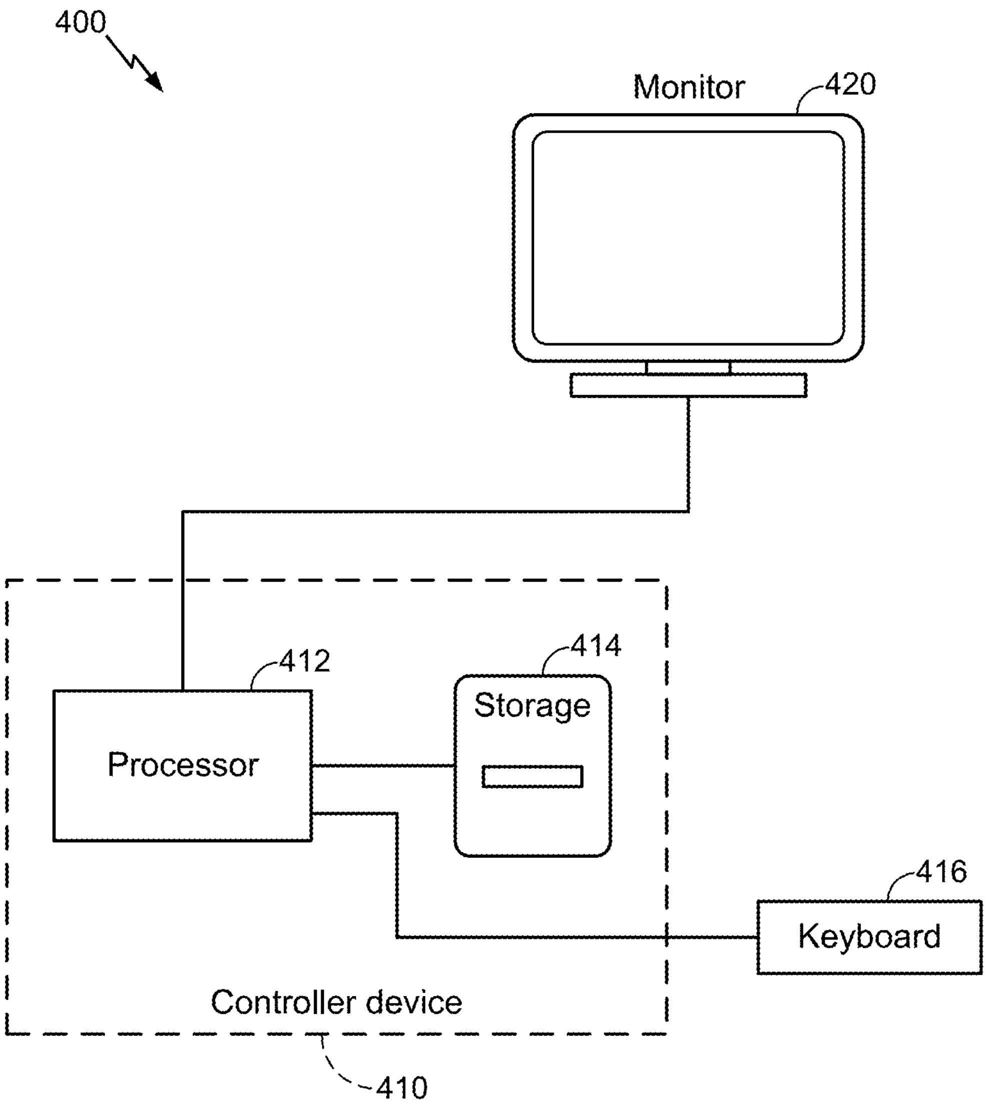
FIG. 4 is a schematic diagram of a processor-based device that may be used to implement, at least partly, some of various devices and nodes depicted in FIGS. 1 and 2.

The functionality implemented via software may depend on the particular device at which the memory 214 is housed, and the particular configuration of the device and/or the devices with which it is to communicate. For example, if the device 200 is used to implement a lock device with limited power availability, the device may be configured (via software modules/applications provided on the memory 214) to implement a process to receive actuation signals from a remote device, authenticate the actuation signal, and then cause (e.g., using power available at the power unit 220, or using power harvested from the received actuation signals and/or ambient RF radiation received at the lock device) actuation of the lock mechanism. In some embodiments, the lock device may be implemented to receive measurement data relating to the environment (e.g., location data, temperature, etc.) and determine based on that data (and/or pre-stored data associated with the lock device) whether to actuate the lock mechanism. In some embodiments (e.g., if the lock device has sufficient available power), the lock device may also be configured to obtain environmental data using on-board sensor measurements. In embodiments in which the device 200 is used to implement a remote device, the instructions stored on the memory 214 may include instructions to, for example, collect environmental data, transmit such data (with or with authentication) to a lock device, transmit actuation signals to the lock device (in such embodiments, the remote device may determine, based on measured data, whether the lock mechanism of the lock device is to be actuated). The memory 214 may be on-board the processor 210 (e.g., within the same IC package), and/or the memory may be external memory to the processor and functionally coupled over a data bus. Further details regarding an example embodiments of a processor or computation system, which may be similar to that of the processor 210, are provided below in relation to FIG. 4.

The example device 200 may further include a user interface 250 which provides any suitable interface systems, such as a microphone/speaker 252, keypad 254, and display 256 that allows user interaction with the mobile device 200. As noted, such a user interface, be it an audiovisual interface (e.g., a display and speakers) of a smartphone such as the smartphone 120*b* of FIG. 1, a tablet-based device such as the tablet-based device 120*a*, or some other type of interface (visual-only, audio-only, tactile, etc.), are configured to provide status data, alert data, and so on, to a user using the particular device 200 (e.g., the cargo handler, an administrator, etc.) The microphone/speaker 252 provides for voice communication functionality, the keypad 254 includes suitable buttons for user input, the display 256 includes any suitable display, such as, for example, a backlit LCD display, and may further include a touch screen display for additional user input modes. The microphone/speaker 252 may also include or be coupled to a speech synthesizer (e.g., a text-to-speech module) that can convert text data to audio speech so that the user can receive audio notifications. Such a speech synthesizer may be a separate module, or may be integrally coupled to the microphone/speaker 252 or to the controller 210 of the device of FIG. 2.

Figure 3:
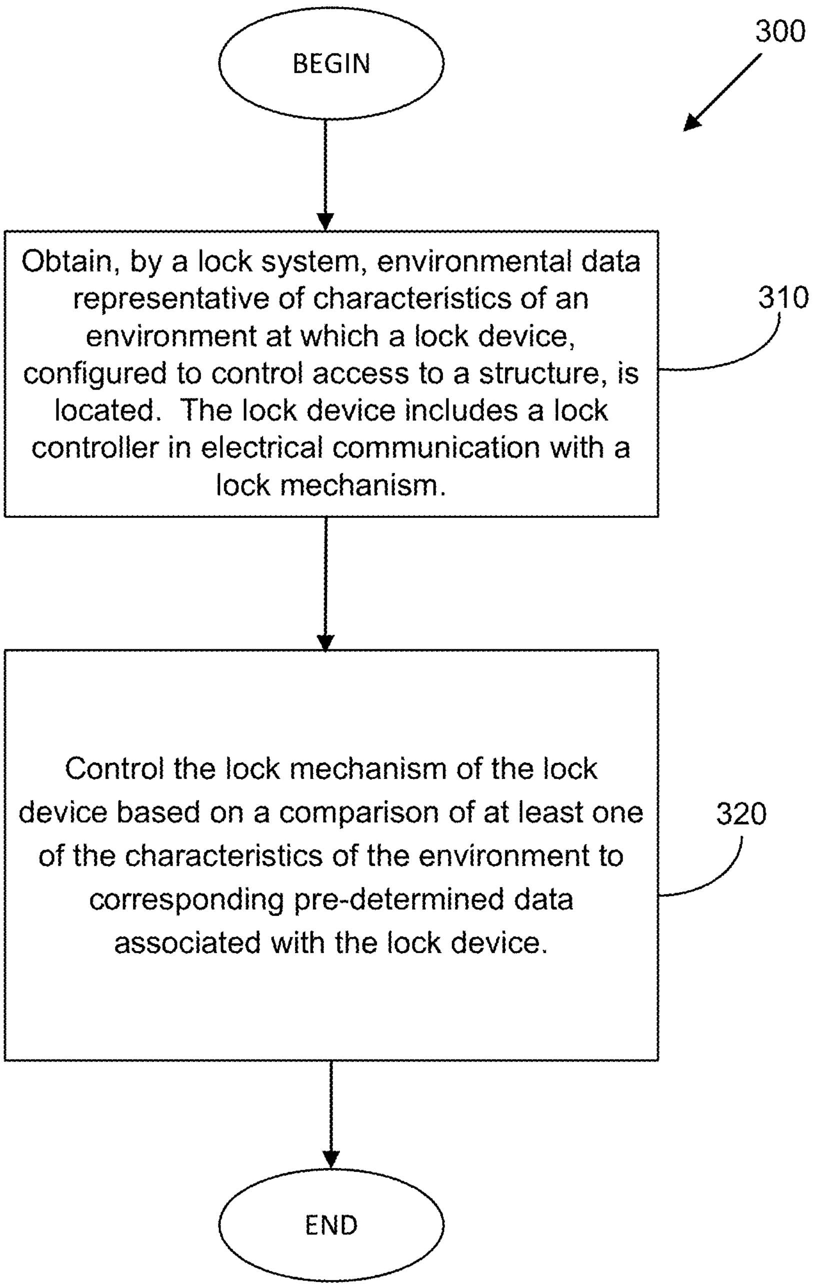
FIG. 3 is a flowchart of an example procedure to control a lock device.

With reference now to FIG. 3, a flowchart of an example procedure 300 to control a lock device is shown. The procedure 300 includes obtaining 310, by a lock system (which may include at least one lock device, such as the lock device 110 of FIG. 1, and at least one remote device, such as the remote devices 120*a-c* and/or the nodes 130, 132, and the server 142), environmental data representative of characteristics of an environment at which the lock device, configured to control access to a structure, is located. The lock device being controlled may be similar to, in configuration and/or functionality, to the lock device 110 depicted in FIG. 1, and may include a lock mechanism (depicted schematically as the lock mechanism 116 of FIG. 1) such as an electrical strike lock mechanism, an electromagnet lock mechanism, or a seal mechanism that monitors whether (and/or when) someone accessed the lock (i.e., whether the seal was broken), etc. The lock or seal mechanism may be operable in a fail-secure configuration, or in a fail-safe configuration. Collected environmental data may be recorded with time/date information (e.g., timestamps) so as to provide temporal information about the data collected.

As noted herein, the lock may also include a controller, which may be implemented, at least in part, using the configuration illustrated in FIG. 2, housed in a controller housing that may also contain at least one communication interface (such as a BLE interface), a power unit (such as the power unit 220 of FIG. 2. optionally coupled to a power harvest unit such as the unit 222 of FIG. 2), and/or one or more sensors.

As noted, in some implementations, due to power conservation considerations, the lock device may have limited power availability, and thus, data collection (of the environmental data) may be performed, at least in part, by one of the remote devices of the lock system. Typically, a remote device, such as a mobile device or a more stationary device (e.g., a computing device secured to a delivery truck carrying the container to which the lock device is affixed) located proximate (e.g., within a short distance at which near-field communication protocols are effective) may be used to collect environmental data about the environment at which the lock device is located. The remote device may obtain the data via one or more of its sensors, or it may receive some of the data from another remote device.

The environmental data collected by the remote device can then be communicated to the lock device for further processing (e.g., to perform the control operations to control/actuate the lock device). Thus, in such embodiments, obtaining the environmental data may include wirelessly receiving from a remote device, at the lock device, the environmental data. As noted, that environmental data may be received via a near-field interface of the lock device, which may include, for example, a Bluetooth interface, a Bluetooth Low Energy interface, or any other type of near-field communication interface realized at the lock device. Alternatively and/or additionally, in some embodiments, at least some of the environmental data may be measured by on-board sensors of the lock device (e.g., temperature sensor, RF receivers, including the receiver of the communication interface receiving data from the remote device, etc.) Thus, in such embodiments, obtaining the environmental data may include determining, at the lock device, at least some of the environmental data based on measurements data obtained by one or more sensors of the lock device.

Turning back to FIG. 3, the procedure 300 further includes controlling 320 the lock mechanism of the lock device based on a comparison of at least one of the characteristics of the environment to corresponding pre-determined data associated with the lock device. For example, a determination is made whether pre-determined data associated with the lock device (such data may be associated with the lock device itself or with the cargo to which the lock device is being used to regulate/control access) matches (or to what extent it deviates) from corresponding environmental data that was obtained (e.g., at operation 310 of the procedure 300). If, for example, it is determined that a particular set/record of environmental data substantially matches (within some level of tolerance, which may be represented in absolute or relative values) corresponding pre-determined data associated with the device, the lock mechanism may be actuated (e.g., to unlock it).

When the comparison operation are performed at the remote device (e.g., at a device such as one of the devices 120*a-c* of FIG. 1) so as to avoid high power consumption at the lock device, upon a determination that a particular environmental data values substantially matches a corresponding pre-determined data values, the remote device may transmit a control signal (e.g., via an appropriate communication interface) that is received by the corresponding communication interface of the lock device. The lock device may then authenticate the signal to ensure that it was issued by an authorized party, and, if authenticated, the lock device causes the lock mechanism to be unlocked or unsealed. Thus, in such embodiments, controlling the lock mechanism of the lock device based on the comparison of the at least one of the characteristics of the environment to the corresponding pre-determined data associated with the lock device may include receiving from a remote wireless device an actuation signal to cause the lock mechanism of the lock to unlock, with the actuation signal transmitted in response to a determination, at the remote wireless device, that the at least one characteristic of the environment substantially matches the corresponding pre-determined data associated with the lock device, and with the corresponding pre-determined data associated with the lock device (e.g., associated with attributes of the lock or of the cargo) being stored at the remote wireless device.

Alternatively, as noted, in some variations, at least some of the pre-determined data associated with the lock device may be stored at the lock device. In such variations, comparison of at least some of the environmental data to the corresponding pre-determined data stored at the lock device is performed at the lock device, and, in response to a determination that the at least some of the environmental data substantially matches the corresponding pre-determined data, the lock device provides an actuation signal to cause the lock mechanism to be unlocked or unsealed.

As noted, the environmental data may include such information as location information, motion data, time data, physical attributes of the area where the lock device is located (e.g., temperature, humidity, altitude, topography), and so on. The pre-determined data (associated with the lock device) against which the environmental data would be compared may include one or more of, for example, cargo placed inside the structure, destination for cargo, attributes of cargo, handling requirements for the cargo, etc. In some embodiments, to enhance data security, at least some of the pre-determined data being stored may be encrypted. Decryption of any of pre-determined data (in order to compare it to current/local environmental data) may then only be performed by an authorized party in possession of the correct decryption key.

Location information may be used to determine if the current position of the lock device substantially matches a pre-determined destination position(s). If the current position of the lock device does not substantially match a pre-determined destination position, the lock device may be kept locked. Thus, in such embodiments, the at least one of the characteristics of the environment may include a geographical position of a remote wireless device in communication with the lock device, and controlling the lock mechanism may include determining whether to unlock the lock device based on a determination of whether the geographical position of the mobile device substantially matches a pre-determined destination position. Motion data can be used to determine if the lock device (or a remote device communicating therewith) is in motion, and prevent/inhibit the unlocking of the lock device is the lock device is determined or inferred to still be in motion (generally, the lock device should be opened only when it reaches its destination and is no longer moving). In such embodiments, the at least one of the characteristics of the environment may thus include motion data representative of motion of the lock device, and controlling the lock mechanism may include determining whether to unlock the lock mechanism based on a determination of whether the motion data substantially matches a pre-determined motion value or behavior (profile) . Motion data can also be used to determine a possible unauthorized attempt to unlock the device, e.g., if the lock device senses, through on-board motion sensors, irregular movement indicative of trying to breach the lock device. It is to be noted that other sensor data may also be used to detect a possible attempt to override/break the lock, including, for example, the detection of a bright light source being directed at the lock device (as may be determined through an optical sensor). If the lock device detects, through measurements made by one or more sensors coupled to the lock device, that a potential lock breach is being attempted, the lock device may be configured, via one of its interfaces to transmit a warning message to a remote server that an attempted lock breach may be under way. It may be necessary, under these circumstances, for a long-range communication interface, such as a WWAN interface, to be used to contact a remote server, since a near-by remote device might belong to the party attempting the breach.

Location and motion data may be derived using any number of location determination and motion determination techniques/procedures, such as deriving position fixes for a particular device through fingerprinting-based procedures, implementations of multilateration-based procedures using, for example, timing-based techniques (e.g., observed-time-difference-of-arrival (or OTDOA), RTT-based measurements, etc.), signal strength measurements (e.g., RSSI measurements), etc., measurement of RF signals received from satellite vehicles and/or from ground-based (terrestrial) devices, and so on. Furthermore, a coarse location for the device (be it the remote wireless device or the lock device) may be derived based on the identity of a wireless node (e.g., a cellular base station or WLAN access point), with the device imputed a location approximation that may be, for example, the known location of the wireless node. Additionally, positioning (location determination operations) may be based, at least in part, using measurements from the device's various inertial/orientation sensors to compute movement/motion for the device, and using the determined motion to compute a position approximation (e.g., using dead reckoning techniques). In some embodiments, movement of the mobile device may be derived based on positioning operations determined based on RF signals. For example, sequential positions of the mobile device may be derived based on RF signals received from satellite and/or terrestrial nodes (e.g., wireless WWAN or WLAN access points, satellite vehicles, etc.) The sequential positions at sequential time instances define motion of the mobile device during the interval between the sequential time instances.

Another environmental characteristic that may be used to control the locking/unlocking of the lock device is the environmental temperature. As noted, cargo stored within the structure locked by the lock device may require specific temperature profile, and may be subject to other particular handling requirements. When it is determined that the required temperature and/or other handling requirements have been satisfied or met, the lock device may be unlocked. Thus, for example, in some embodiments, the at least one of the characteristics of the environment may include a temperature of the environment in which the lock device is located, the pre-determined data associated with the lock device may include a pre-determined temperature value at which cargo inside the structure needs to be maintained, and controlling the lock mechanism may include determining whether to unlock the lock device based on a determination of whether the temperature of the environment in which the lock device is located substantially matches the pre-determined temperature value at which the cargo inside the structure needs to be maintained.

As discussed herein, in some embodiments, the environmental data may be used to perform other types of cargo management and delivery operations (and not only lock device control). For example, the temperature of the cargo may be monitored, and, in conjunction with determined location information, the cargo (or, rather, the vehicle/vessel carrying the cargo) may be routed to handling centers (e.g., refrigeration centers, when the cargo requires special refrigeration handling).

Performing the various operations described herein may be facilitated by a processor-based computing system. Particularly, each of the various systems/devices described herein may be implemented, at least in part, using one or more processing-based devices such as a computing system. Thus, with reference to FIG. 4, a schematic diagram of a computing system 400 is shown. The computing system 400 includes a processor-based device 410 such as a personal computer, a specialized computing device, and so forth, that typically includes a central processor unit 412. In addition to the CPU 412, the system includes main memory, cache memory and bus interface circuits (not shown). The processor-based device 410 may include a mass storage element 414, such as a hard drive or flash drive associated with the computer system. The computing system 400 may further include a keyboard, or keypad, or some other user input interface 416, and a monitor 420, e.g., a CRT (cathode ray tube) or LCD (liquid crystal display) monitor, that may be placed where a user can access them.

The processor-based device 410 is configured to facilitate, for example, the implementation of operations to control a lock device (such as the lock device 110 of FIG. 1). The storage device 414 may thus include a computer program product that when executed on the processor-based device 410 causes the processor-based device to perform operations to facilitate the implementation of the above-described procedures and operations. The processor-based device may further include peripheral devices to enable input/output functionality. Such peripheral devices may include, for example, a CD-ROM drive and/or flash drive (e.g., a removable flash drive), or a network connection (e.g., implemented using a USB port and/or a wireless transceiver), for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), an ASIC (application-specific integrated circuit), a DSP processor, etc., may be used in the implementation of the system 400. Other modules that may be included with the processor-based device 410 are speakers, a sound card, a pointing device, e.g., a mouse or a trackball, by which the user can provide input to the computing system 400. The processor-based device 410 may include an operating system, e.g., Windows XP® Microsoft Corporation operating system. Alternatively, other operating systems could be used.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Some or all of the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an embodiment of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server generally arises by virtue of computer programs running on the respective computers and having a client-server relationship to each other.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method comprising:

obtaining, by a lock system comprising a lock device in communication with a mobile device, environmental data representative of characteristics of an environment at which the lock device, configured to control access to a structure, is located, the lock device comprising a lock controller in electrical communication with a lock mechanism and an RF power harvesting module, wherein at least some of the environmental data is measured at the mobile device; and controlling the lock mechanism of the lock device based on a comparison of at least one of the characteristics of the environment to corresponding pre-determined data associated with the lock device;

wherein controlling the lock mechanism comprises:

comparing the at least some of the environmental data measured at the mobile device to respective pre-determined data, and transmitting, in response to a determination that the at least some of the environmental data measured at the mobile device substantially matches the respective pre-determined data, from the mobile device to the lock device an authenticated RF actuation signal to cause unlocking of the lock mechanism, wherein the authenticated RF actuation signal is converted by the RF power harvesting module of the lock device to electric power upon authentication of the received RF actuation signal, using authentication data included in the RF actuation signal to verify that the authenticated RF actuation signal was received from an authorized device, and the electrical power produced from the authenticated RF actuation signal is directed to the lock mechanism to cause electro-mechanical actuation of the lock mechanism to unlock the lock mechanism.

2. The method of claim 1, wherein obtaining the environmental data comprises:

wirelessly receiving from the mobile device, at the lock device, a portion of the environmental data.

3. The method of claim 2, wherein wirelessly receiving from the mobile device the portion of the environmental data comprises:

wirelessly receiving the portion of the environmental data, via a near-field interface of the lock device, from the mobile device located within near-field communication range of the lock device.

4. The method of claim 3, wherein the near-field interface comprises a Bluetooth Low energy (BLE) interface.

5. The method of claim 1, wherein obtaining the environmental data comprises:

determining, at the lock device, at least some other of the environmental data based on measurements data obtained by one or more sensors of the lock device.

6. The method of claim 1, further comprising:

storing on a memory storage device coupled to the lock device at least some of the pre-determined data associated with the lock device.

7. The method of claim 1, wherein controlling the lock mechanism of the lock device comprises:

receiving from the mobile device the actuation signal to cause the lock mechanism of the lock to unlock, the actuation signal transmitted in response to the determination, at the mobile device, that the at least some of the environmental data measured at the mobile device substantially matches the respective pre-determined data associated with the lock device, wherein the respective pre-determined data associated with the lock device is stored at the mobile device.

8. The method of claim 1, wherein the at least one of the characteristics of the environment includes a geographical position of the mobile device in communication with the lock device, and wherein controlling the lock mechanism comprises:

determining whether to unlock the lock device based on a determination of whether the geographical position of the mobile device substantially matches a pre-determined destination position.

9. The method of claim 1, wherein the at least one of the characteristics of the environment includes a temperature of the environment in which the lock device is located, wherein the pre-determined data associated with the lock device comprises a pre-determined temperature value at which cargo inside the structure needs to be maintained, and wherein controlling the lock mechanism comprises:

determining whether to unlock the lock device based on a determination of whether the temperature of the environment in which the lock device is located substantially matches the pre-determined temperature value at which the cargo inside the structure needs to be maintained.

10. The method of claim 1, wherein the at least one of the characteristics of the environment includes motion data representative of motion of the lock device, and wherein controlling the lock mechanism comprises:

determining whether to unlock the lock mechanism based on a determination of whether the motion data substantially matches a pre-determined motion value.

11. The method of claim 1, wherein the pre-determined data associated with the lock device comprises one or more of: cargo placed inside the structure, destination for the cargo, attributes of the cargo, or handling requirements for the cargo.

12. The method of claim 1, wherein the lock mechanism comprises one or more of: an electromagnetic lock operable in a fail-secure configuration, or an electrical strike lock operable in the fail-secure configuration.

13. The method of claim 1, further comprising:

determining, based on current temperature data obtained for the lock system, based on the pre-determined temperature data relating to temperature handling requirements for cargo inside the structure, and based on current location data, navigation data to one or more refrigeration centers to facilitate temperature handling for the cargo.

14. The method of claim 1, wherein at least some of the environmental data comprises at least one environmental condition at an area near the lock system, wherein controlling the lock mechanism comprises:

comparing the at least one environmental condition measured at the mobile device to corresponding pre-determined environmental condition data, and transmitting from the mobile device to the lock device the actuation signal to control the unlocking of the lock mechanism in response to a determination that the at least one environmental condition measured at the mobile device substantially matches the corresponding pre-determined environmental condition data.

15. A method comprising:

obtaining, by a lock device comprising a lock controller in electrical communication with a lock mechanism and an RF power harvesting module, environmental data representative of characteristics of an environment at which the lock device is located, with at least some of the environmental data being measured at a mobile device, wherein the lock device is configured to control access to a structure; and controlling, by the lock device, the lock mechanism of the lock device based on a comparison of at least one of the characteristics of the environment to corresponding pre-determined data associated with the lock device;

wherein controlling the lock mechanism comprises receiving, from the mobile device, an authenticated RF actuation signal to cause unlocking of the lock mechanism in response to a determination that a remote comparison, at the mobile device, of the at least some of the environmental data measured at the mobile device to respective pre-determined data substantially matches the respective pre-determined data, wherein the authenticated RF actuation signal is converted by the RF power harvesting module to electric power upon authentication of the received RF actuation signal, using authentication data included in the RF actuation signal to verify that the authenticated RF actuation signal was received from an authorized device, and the electrical power produced from the authenticated RF actuation signal is directed to the lock mechanism to cause electro-mechanical actuation of the lock mechanism to unlock the lock mechanism.

16. The method of claim 15, wherein obtaining the environmental data comprises one or more of:

wirelessly receiving the at least some of the environmental data from the mobile device that measured the at least some of the environmental data, via a near-field communication interface of the lock device; or measuring at least some other of the environmental data using one or more sensors of the lock device coupled to the lock controller.

17. The method of claim 15, wherein controlling the lock mechanism of the lock device comprises one or more of:

determining whether to unlock the lock mechanism based on a determination of whether a geographical position of the mobile device in communication with the lock device substantially matches a pre-determined destination position stored at the lock device or the mobile device; or determining whether to unlock the lock mechanism based on a determination of whether a temperature of the environment in which the lock device is located substantially matches a pre-determined temperature value, stored at the lock device or the mobile device, at which cargo inside the structure needs to be maintained.

18. A lock device to inhibit physical access to a structure on which the lock device is placed, the device comprising:

a lock mechanism;

a communication module to communicate with remote devices, wherein the remote devices comprise one or more mobile devices, the communication module configured to obtain from a mobile device, of the one or more mobile devices, environmental data representative of characteristics of an environment at which the lock device is located, with at least some of the environmental data being measured by the mobile device;

an RF power harvesting module; and a controller coupled to the lock mechanism, the controller configured to control the lock mechanism of the lock device based on a comparison of at least one of the characteristics of the environment to corresponding pre-determined data associated with the lock device;

wherein the controller configured to control the lock mechanism is configured to receive, from the mobile device, an authenticated RF actuation signal to cause unlocking of the lock mechanism in response to a determination that a remote comparison, at the mobile device, of the at least some of the environmental data measured at the mobile device to respective pre-determined data substantially matches the respective pre-determined data, wherein the authenticated RF actuation signal is converted by the RF power harvesting module to electric power upon authentication of the received RF actuation signal, using authentication data included in the RF actuation signal to verify that the authenticated RF actuation signal was received from an authorized device, the electrical power produced from the authenticated RF actuation signal is directed to the lock mechanism to cause electro-mechanical actuation of the lock mechanism to unlock the lock mechanism.

19. The lock device of claim 18, wherein the communication module is configured to obtain a message comprising a geographical position of the mobile device in communication with the lock device, and wherein the controller configured to control the lock mechanism is configured to:

determine whether to unlock the lock mechanism based on a determination of whether the geographical position of the mobile device substantially matches a predetermined destination position.

20. The lock device of claim 18, wherein the communication module is configured to obtain a message comprising a temperature of the environment in which the lock device is located, and wherein the controller configured to control the lock mechanism is configured to:

determine whether to unlock the lock mechanism based on a determination of whether the temperature of the environment in which the lock device is located substantially matches a pre-determined temperature value at which a cargo inside the structure needs to be maintained.

21. The lock device of claim 18, further comprising one or more of:

a memory storage device to store at least some of the corresponding pre-determined data associated with the lock device; or one or more sensors to measure data relating to one or more of the characteristics of the environment at which the lock device is located.

* * * * *